US009026913B2

(12) United States Patent
Demarta et al.

(10) Patent No.: US 9,026,913 B2
(45) Date of Patent: May 5, 2015

(54) REPLACING AN IMAGE WITH A MEDIA PLAYER

(75) Inventors: Stanley Peter Demarta, Pleasanton, CA (US); David Jack Ovadia, Danville, CA (US); Peter W. Winer, Los Altos, CA (US); Jeff Sturgis, Oakland, CA (US); Rajesh Navaneethakrishnan, Santa Clara, CA (US)

(73) Assignee: LinkedIn Corporation, Mountain View, CA (US)

( * ) Notice: Subject to any disclaimer, the term of this patent is extended or adjusted under 35 U.S.C. 154(b) by 256 days.

(21) Appl. No.: 12/814,347

(22) Filed: Jun. 11, 2010

(65) Prior Publication Data

US 2011/0307785 A1    Dec. 15, 2011

(51) Int. Cl.
| G11B 27/34 | (2006.01) |
| G06F 9/445 | (2006.01) |
| G11B 27/10 | (2006.01) |
| H04N 21/2743 | (2011.01) |
| H04N 21/431 | (2011.01) |

(52) U.S. Cl.
CPC .......... *G06F 9/44526* (2013.01); *G11B 27/102* (2013.01); *G11B 27/34* (2013.01); *H04N 21/2743* (2013.01); *H04N 21/431* (2013.01)

(58) Field of Classification Search
USPC .................................................. 715/716–722
See application file for complete search history.

(56) References Cited

U.S. PATENT DOCUMENTS

| 5,818,446 | A | * | 10/1998 | Bertram et al. ............... 715/746 |
| 5,903,775 | A | * | 5/1999 | Murray ............................ 710/33 |
| 6,075,528 | A | * | 6/2000 | Curtis ............................. 715/866 |
| 6,134,243 | A | * | 10/2000 | Jones et al. .................... 370/465 |
| 6,262,724 | B1 | * | 7/2001 | Crow et al. ..................... 715/723 |
| 6,393,605 | B1 | * | 5/2002 | Loomans ........................ 717/121 |
| 6,490,547 | B1 | * | 12/2002 | Atkin et al. ........................ 704/8 |
| 6,587,124 | B1 | * | 7/2003 | Slaby ............................. 715/735 |
| 6,671,807 | B1 | * | 12/2003 | Jaisimha et al. ............... 713/193 |
| 7,159,174 | B2 | * | 1/2007 | Johnson et al. ................ 715/716 |
| 7,194,743 | B2 | * | 3/2007 | Hayton et al. ................. 719/315 |
| 7,475,112 | B2 | * | 1/2009 | Sinclair et al. ................ 709/204 |
| 7,620,758 | B2 | * | 11/2009 | Hsu ................................ 710/72 |
| 7,788,583 | B1 | * | 8/2010 | Amzallag et al. ............. 715/719 |
| 8,302,005 | B2 | * | 10/2012 | Gibby et al. ................... 715/704 |
| 2001/0007455 | A1 | * | 7/2001 | Yoo et al. ....................... 345/856 |
| 2004/0046801 | A1 | * | 3/2004 | Lin et al. ........................ 345/810 |
| 2004/0104893 | A1 | * | 6/2004 | Huang ............................ 345/168 |
| 2005/0114717 | A1 | * | 5/2005 | Chen .............................. 713/300 |
| 2005/0270060 | A1 | * | 12/2005 | Mulligan ........................ 326/37 |
| 2006/0168015 | A1 | * | 7/2006 | Fowler ........................... 709/206 |
| 2007/0011200 | A1 | * | 1/2007 | Park ............................ 707/104.1 |
| 2008/0086531 | A1 | * | 4/2008 | Chavda et al. ................ 709/206 |
| 2008/0229016 | A1 | * | 9/2008 | Waites ........................... 711/115 |
| 2009/0013048 | A1 | * | 1/2009 | Partaker et al. ............... 709/206 |
| 2009/0207316 | A1 | * | 8/2009 | Cupal et al. ................... 348/700 |
| 2010/0070483 | A1 | * | 3/2010 | Delgo et al. ................... 707/706 |
| 2010/0145796 | A1 | * | 6/2010 | Berry et al. ................ 705/14.49 |
| 2010/0228758 | A1 | * | 9/2010 | Lim et al. ...................... 707/758 |
| 2010/0251384 | A1 | * | 9/2010 | Yen ................................. 726/27 |
| 2011/0035669 | A1 | * | 2/2011 | Shirali et al. .................. 715/716 |
| 2013/0167005 | A1 | * | 6/2013 | Corbett et al. ................ 715/234 |

* cited by examiner

*Primary Examiner* — Phenuel Salomon
(74) *Attorney, Agent, or Firm* — Schwegman Lundberg & Woessner, P.A.

(57) ABSTRACT

A computer-implemented method that includes receiving a request to generate an interface within a software application that is configured to play back one or more media files; for a first media file, generating an image representing a frame of the first media file; and causing the image to be displayed within the interface on a display device, where the image is configured to detect an event that causes a media player to be loaded into the software application behind the image.

14 Claims, 6 Drawing Sheets

REPLACING AN IMAGE WITH A MEDIA PLAYER

BACKGROUND OF THE INVENTION

1. Field of the Invention

Embodiments of the invention generally relate to video playback and, more specifically, to replacing an image with a media player.

2. Description of the Related Art

Sharing of digital media among users has evolved rapidly over the past decade. Digital video cameras can be used to capture digital videos that can be uploaded to a web server, such as a video web service, for sharing and viewing. One example of a video web service is YouTube.com. Many video sharing web sites incorporate embedded media players that are created using Adobe Flash™ software developed by Adobe Systems Incorporated.

Web pages are often configured to include multiple embedded media players. This allows web page visitors to conveniently view a plurality of media files played within by the media players, thereby enhancing their overall user experience. However, embedding multiple media players into a web page degrades the web page performance and the overall performance of a system that is used to view the web page. This often leads to crashing the web browser or even the computer system as a whole.

Accordingly, there remains a need in the art for an improved technique for loading one or more media players into a web browser.

SUMMARY

One embodiment of the invention provides a computer-implemented method that includes receiving a request to generate an interface within a software application that is configured to play back one or more media files; for a first media file, generating an image representing a frame of the first media file; and causing the image to be displayed within the interface on a display device, where the image is configured to detect an event that causes a media player to be loaded into the software application behind the image.

Advantageously, embodiments of the invention provide the ability to include multiple media players within a user interface without exhausting resources of a computer system. Each media player is loaded only when a user selects an image that is rendered to depict a media player, thereby saving memory of the system without degrading the overall user experience.

DESCRIPTION OF EXAMPLE EMBODIMENTS

Embodiments of the invention provide techniques for receiving a request to generate an interface configured to play back one or more media files. For each of the one or more media files, an image is generated that represents a frame included in the media file. Each image can be replaced with a media player configured to play back the corresponding media file after an event is detected for that particular media player.

System Overview

Figure 1:
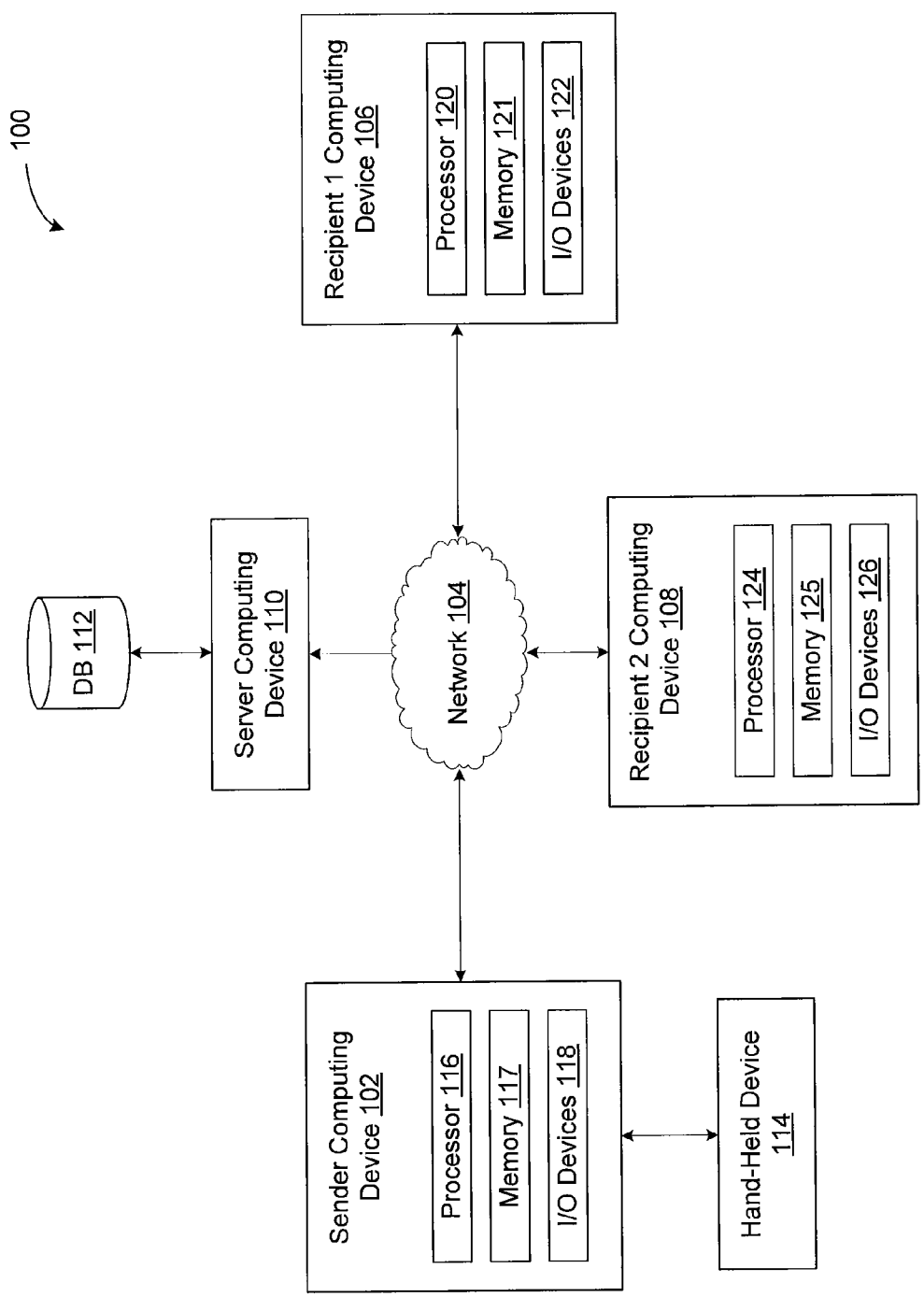
FIG. 1 is a block diagram illustrating components of a system configured to implement one or more aspects of the invention.

FIG. 1 is a block diagram illustrating components of a system 100 configured to implement one or more aspects of the invention. As shown, the system 100 includes a sender computing device 102, a network 104, a first recipient computing device 106, a second recipient computing device 108, a server computing device 110, a database 112, and a handheld device 114.

Each of the sender computing device 102, the first recipient computing device 106, the second recipient computing device 108, and the server computing device 110 may be any technically feasible type of computing system. In an alternative embodiment, the computing devices 102, 106, 108 may comprise at least one of a web-enabled television, a mobile phone, or a computer monitor that includes computing hardware, among others.

The computing devices 102, 106, 108, 110 are coupled to one another via the network 104 and may transmit and receive data across the network 104. The network 104 may be any type of network, including the World Wide Web, the Internet, a local area network (LAN), a wide area network (WAN), an intranet, a cellular network, or any other technically feasible type of network.

The sender computing device 102 includes a processor 116, a memory 117, and input/output (I/O) devices 118. The processor 116 is coupled to the I/O devices 118 and to the memory 117. The processor 116 is the primary processor of the sender computing device 102. The processor 116 may be at least one of a single-core processor, a multi-core processor, an application-specific integrated circuit (ASIC), a field-programmable gate array (FPGA), a graphics processing unit (GPU), and a combination of processing units. The processor 116 is configured to execute program instructions stored in the memory 117. The program instructions may include software applications, drivers, and/or operating systems. In one embodiment, the software application provides a user interface that allows a sender to share one or more media items with one or more recipients with a channel, as described in greater detail herein. In some embodiments, the user interface comprises a web browser.

The I/O devices 118 may include at least one of a keyboard, a mouse, a monitor, a speaker, a switch, a touchscreen, a universal serial bus (USB) port, a firewire port, a serial port, an Ethernet port, a disk drive, a flash drive, and a wireless network card, among others. In one embodiment, the I/O devices 118 are used to transmit data to and receive data from the network 104. In another embodiment, the I/O devices 118 can be used to store data in the memory 117.

The memory 117 may be any type of memory unit, including at least one of a random-access memory (RAM) unit, a dynamic RAM (DRAM) unit, a hard disk drive, and a flash memory module, among others. The memory 117 is configured to store software applications, drivers, and/or operating systems. In one embodiment, the memory 117 stores a software application that, when executed by the processor 116, provides a user interface for sharing media items with recipients.

The first recipient computing device 106 includes a processor 120, a memory 121, and I/O devices 122. The processor 120 is coupled to the I/O devices 122 and to the memory 121. The processor 120 is the primary processor of the first recipient computing device 106. The processor 120 may be a single-core processor, a multi-core processor, an ASIC, an FPGA, a GPU, or a combination of processing units. The processor 120 is configured to execute program instructions stored in the memory 121. The program instructions may include software applications, drivers, and/or operating systems. In one embodiment, the software applications include one or more programs configured to provide a user interface for a viewport in which multiple streams of shared media items are aggregated.

The I/O devices 122 may include at least one of a keyboard, a mouse, a monitor, a speaker, a switch, a touchscreen, a USB port, a firewire port, a serial port, an Ethernet port, a disk drive, a flash drive, and a wireless network card, among others. In one embodiment, the I/O devices 122 are used to transmit data to and receive data from the network 104. In another embodiment, the I/O devices 122 can be used to store data in the memory 121.

The memory 121 may be any type of memory unit, including a random-access memory (RAM) unit, a dynamic RAM (DRAM) unit, a hard disk drive, or a flash memory module, among others. The memory 121 is configured to store software applications, drivers, and/or operating systems. In one embodiment, the memory 121 stores a software application that, when executed by the processor 120, provides a user interface for receiving shared media.

The second recipient computing device 108 includes a processor 124, a memory 125, and I/O devices 126. In one embodiment, the processor 124, the memory 125, and the I/O devices 126 included in the second recipient computing device 108 are substantially similar to the processor 120, the memory 121, and the I/O devices 122, respectively, included in the first recipient computing device 106, and are not described in greater detail herein.

In the system 100 illustrated in FIG. 1, two different recipient computing devices 106, 108 are shown. In alternative embodiments, the system 100 may include one recipient computing device, or more than two different recipient computing devices. Similarly, in the system 100 illustrated in FIG. 1, one sender computing device 102 is shown. In alternative embodiments, the system 100 may include two or more different sender computing devices. In still further embodiments, a particular computing device may be both a sender computing device and a recipient computing device, as described in greater detail herein.

The server computing device 110 includes a processor, a memory, and I/O devices (none shown). Similar to the processors 116, 120, 124 included in the other computing devices 102, 106, 108 shown in FIG. 1, the processor included in the server computing device 110 is coupled to the I/O devices and to the memory. The processor is the primary processor of the server computing device 110. The processor may be at least one of a single-core processor, a multi-core processor, an ASIC, an FPGA, a GPU, and a combination of processing units. In some embodiments, the processor may be configured to execute program instructions stored in the memory. The program instructions may include software applications, drivers, and/or operating systems. In one embodiment, the software applications may include a program that allows for the sharing of one or more media items between a sender and one or more recipients via a channel.

Additional details of a computing device, such as one or more of the computing devices 102, 106, 108, 110, are described below in greater detail in FIG. 2.

As shown, the server computing device 110 is coupled to a database 112. The database 112 may be any technically feasible type of storage device, including one comprising a distributed storage architecture. In one embodiment, the database 112 stores the media items being shared between a sender and one or more recipients via channels. In some embodiments, the database 112 is included within the server computing device 110.

The hand-held device 114 may be any technically feasible type of hand-held device, including, for example, a digital video camera, a digital photo camera, or a cellular phone. In some embodiments that hand-held device 114 comprises the sender computing device 102.

Figure 2:
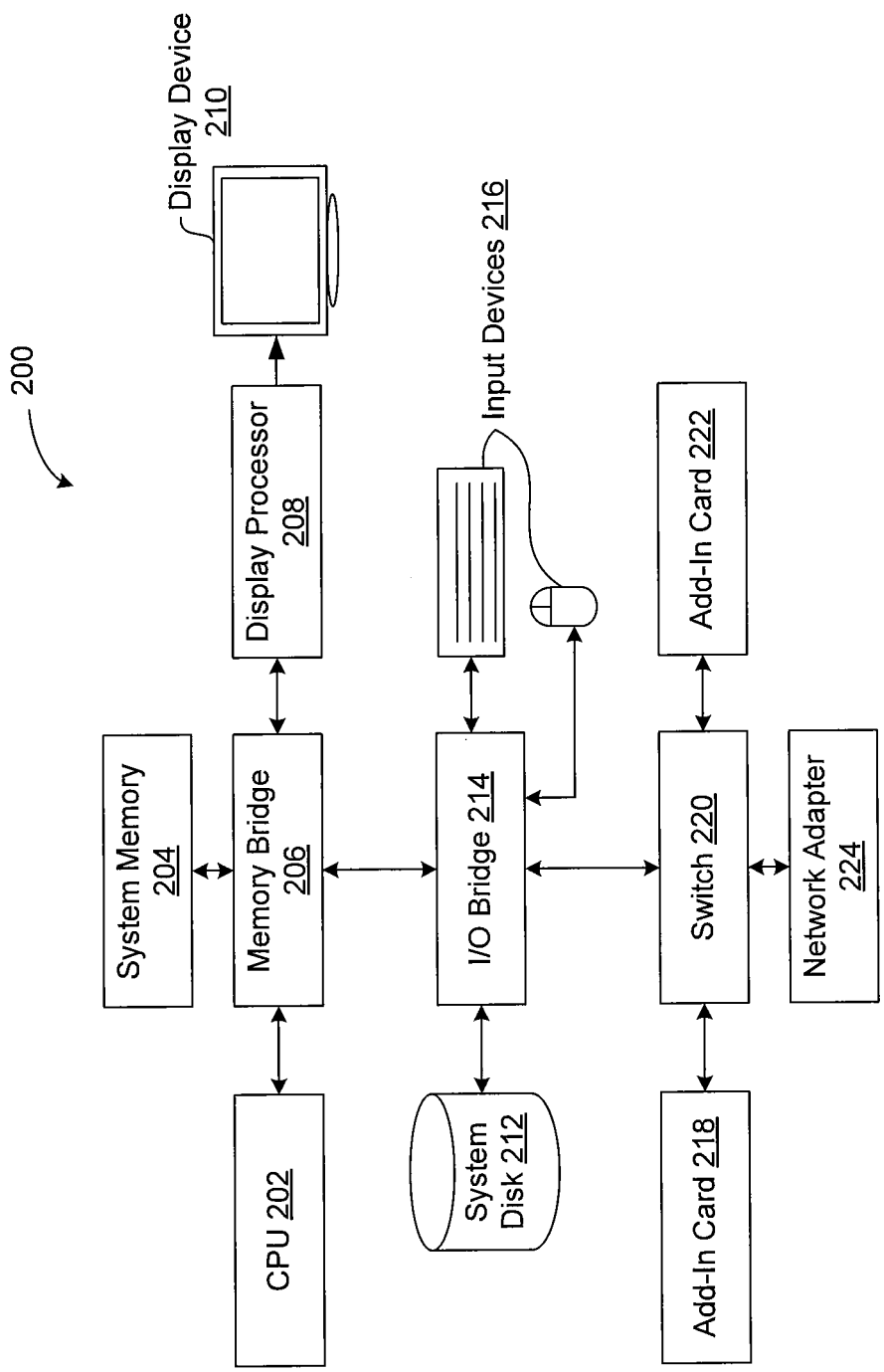
FIG. 2 is a block diagram of a computing device, according to one embodiment of the invention.

FIG. 2 is a block diagram of a computing device 200, according to one embodiment of the invention. The computing device 200 is one embodiment of a configuration of one or more of the computing devices 102, 106, 108, 110, shown in FIG. 1. Computing device 200 may be at least one of a personal computer, video game console, personal digital assistant, rendering engine, mobile phone, web-enabled TV, set-top box, and any other device suitable for practicing one or more embodiments of the invention.

As shown, computing device 200 includes a CPU 202 and a system memory 204 communicating via a bus path that may include a memory bridge 206. CPU 202 includes one or more processing cores, and, in operation, CPU 202 is the master processor of computing device 200, controlling and coordinating operations of other system components. System memory 204 stores software applications and data for use by CPU 202. CPU 202 runs software applications and optionally an operating system. Memory bridge 206, which may be, e.g., a Northbridge chip, is connected via a bus or other communication path (e.g., a HyperTransport link) to an I/O (input/output) bridge 214. I/O bridge 214, which may be, e.g., a Southbridge chip, receives user input from one or more user input devices 216 (e.g., keyboard, mouse, joystick, digitizer tablets, touch pads, touch screens, still or video cameras, motion sensors, and/or microphones) and forwards the input to CPU 202 via memory bridge 206.

A display processor 208 is coupled to memory bridge 206 via a bus or other communication path (e.g., a PCI Express, Accelerated Graphics Port, or HyperTransport link); in one embodiment display processor 208 is a graphics subsystem that includes at least one GPU and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Display processor 208 periodically delivers pixels to a display device 210 (e.g., a screen or conventional CRT, plasma, OLED, SED or LCD based monitor or television). Additionally, display processor 208 may output pixels to digital recorders adapted to reproduce computer generated images on digital media. Display processor 208 can provide display device 210 with an analog or digital signal.

A system disk 212 is also connected to I/O bridge 214 and may be configured to store content and applications and data for use by CPU 202 and display processor 208. System disk 212 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 220 provides connections between I/O bridge 214 and other components such as a network adapter 224 and various add-in cards 218 and 222. Network adapter 224 allows computing device 200 to communicate with other systems via an electronic communications network, and may include wired or wireless communication over local area networks and wide area networks such as the Internet.

Other components (not shown), including USB or other port connections, film recording devices, and the like, may also be connected to I/O bridge 214. For example, an audio processor may be used to generate analog or digital audio output from instructions and/or data provided by CPU 202, system memory 204, or system disk 212. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 208 incorporates circuitry optimized for graphics and video processing, including, for example, video output circuitry, and constitutes a GPU. In another embodiment, display processor 208 incorporates circuitry optimized for general purpose processing. In yet another embodiment, display processor 208 may be integrated with one or more other system elements, such as the memory bridge 206, CPU 202, and I/O bridge 214 to form a system on chip (SoC). In still further embodiments, display processor 208 is omitted and software executed by CPU 202 performs the functions of display processor 208.

Pixel data can be provided to display processor 208 directly from CPU 202. In some embodiments of the present invention, instructions and/or data representing a scene are provided to a render farm or a set of server computers, each similar to computing device 200, via network adapter 224 or system disk 212. The render farm generates one or more rendered images of the scene using the provided instructions and/or data. These rendered images may be stored on computer-readable media in a digital format and optionally returned to computing device 200 for display. Similarly, stereo image pairs processed by display processor 208 may be output to other systems for display, stored in system disk 212, or stored on computer-readable media in a digital format.

Alternatively, CPU 202 provides display processor 208 with data and/or instructions defining the desired output images, from which display processor 208 generates the pixel data of one or more output images. The data and/or instructions defining the desired output images can be stored in system memory 204 or graphics memory within display processor 208.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 206 and CPU 202. In other alternative topologies, display processor 208 is connected to I/O bridge 214 or directly to CPU 202, rather than to memory bridge 206. In still other embodiments, I/O bridge 214 and memory bridge 206 might be integrated into a single chip. The particular components shown herein are optional; for instance, any number of add-in cards or peripheral devices might be supported. In some embodiments, switch 220 is eliminated, and network adapter 224 and add-in cards 218, 222 connect directly to I/O bridge 214.

Replacing an Image with a Media Player

Figure 3:
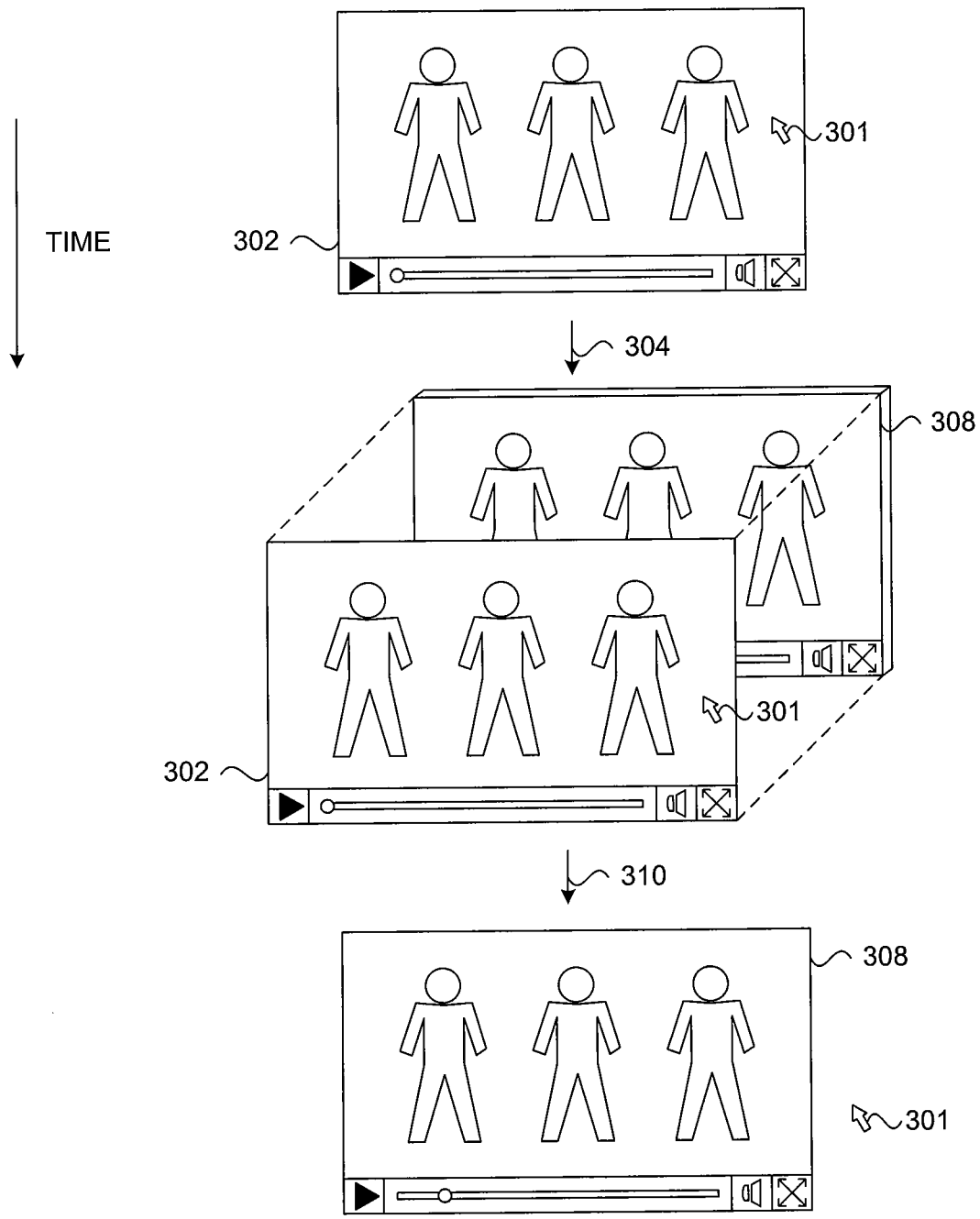
FIG. 3 is a conceptual diagram illustrating replacing an image with a media player, according to one embodiment of the invention.

FIG. 3 is a conceptual diagram illustrating replacing an image with a media player, according to one embodiment of the invention. In one embodiment, an image 302 is a digital image that depicts the media player 308. The image 302 is included in a software application, such as a web browser. As shown, the image 302 represents the user interface of the media player 308 that includes playback, volume, and video resolution controls. However, since the image 302 is merely in image that resembles the media player, but is not an actual media player, the controls included in the image, when selected by the user, have no effect.

In one embodiment, an event 304 occurs when a cursor 301 enters within the boundaries of the image 302. Accordingly, the image 302 is pre-configured to detect a "mouse-enter" event, as further described in FIGS. 4A-4B and 5. The mouse-enter event causes a media player 308 to be loaded directly behind the image 302 so that a user viewing the web page is unaware of the changes occurring, i.e., that the media player 308 is loading behind the image 302. In the example shown in FIG. 3, media player 308 is shown offset to the image 302 for illustrative purposes only.

An event 310 occurs when the media player 308 has completed loading. As shown, the image 302 is no longer present after event 310. In one embodiment, the image 302 is removed from the web page when the media player 308 has completed loading. In other embodiments, the transparency of the image 302 is increased as the player loads. In further embodiments, the transparency of the image 302 is increased proportionally to the load status of the player or increased over a pre-configured amount of time. In both embodiments, a seamless transition between the image 302 and the media player is provided.

Figure 4A:
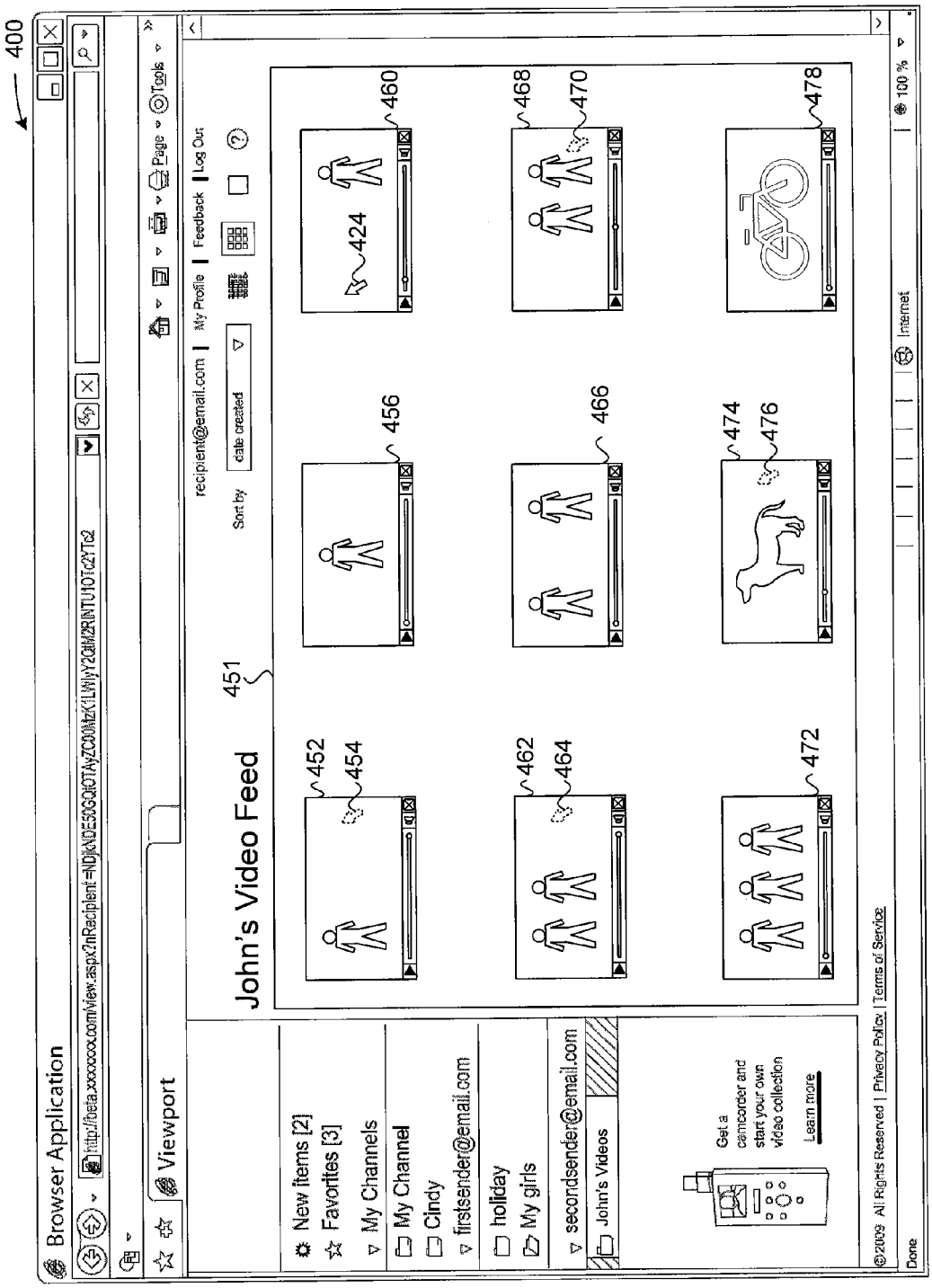
FIG. 4A is a screenshot of a web browser that is configured to load a web page that includes a viewport, according to one embodiment of the invention.

FIG. 4A is a screenshot of a web browser that is configured to load a web page that includes a viewport, according to one embodiment of the invention. As shown, viewport may be displayed in a browser application 400 that includes a video feed window 451, an active cursor 424, and previous cursors 454, 464, 470, 476. The video feed window 451 includes media players 452, 462, 468, 474, and images 456, 460, 466, 472, 478.

As shown, the images 456, 460, 466, 472, 478 are indistinguishable from the media players 452, 462, 468, 474 to a view of the web page. More specifically, the viewer of the web browser application perceives and interprets the images 456, 460, 466, 472 478 as actual media players loaded into the web page. As described herein, a mouse-enter event has not yet occurred for each of the images 456, 466, 472, 478 and, thus, these images remain displayed within the video feed window 451. By contrast, a mouse-enter event has occurred for the images that were previously located in the position of each of the media players 452, 462, 468 and 474.

The previous cursors 454, 464, 470, 476 represent the location of the mouse cursor at previous moments in time. As depicted by the previous cursors 454, 464, 470, 476, each of the corresponding media players 452, 462, 468, 474, respectively, has been "moused-over" by the cursor. As described above in FIG. 3, each image is replaced by a media player when a mouse-enter event is detected over the image. For example, the media player 452 replaced an image (not shown)

when the previous cursor entered within the boundaries of the image. Thus, each of the media players 452, 462, 468, 474 were previously represented by images that have been removed subsequent to mouse-enter events. In other embodiments, an event other than a mouse-enter event may trigger an image being replaced by a media player.

Accordingly, in some embodiments, when a user navigates to a web page that is configured to implement embodiments of the invention, images are loaded for each video to be displayed in the webpage. Each image may represent a media player, where the first frame of the video to be played by a particular media player is depicted in the image.

Figure 4B:
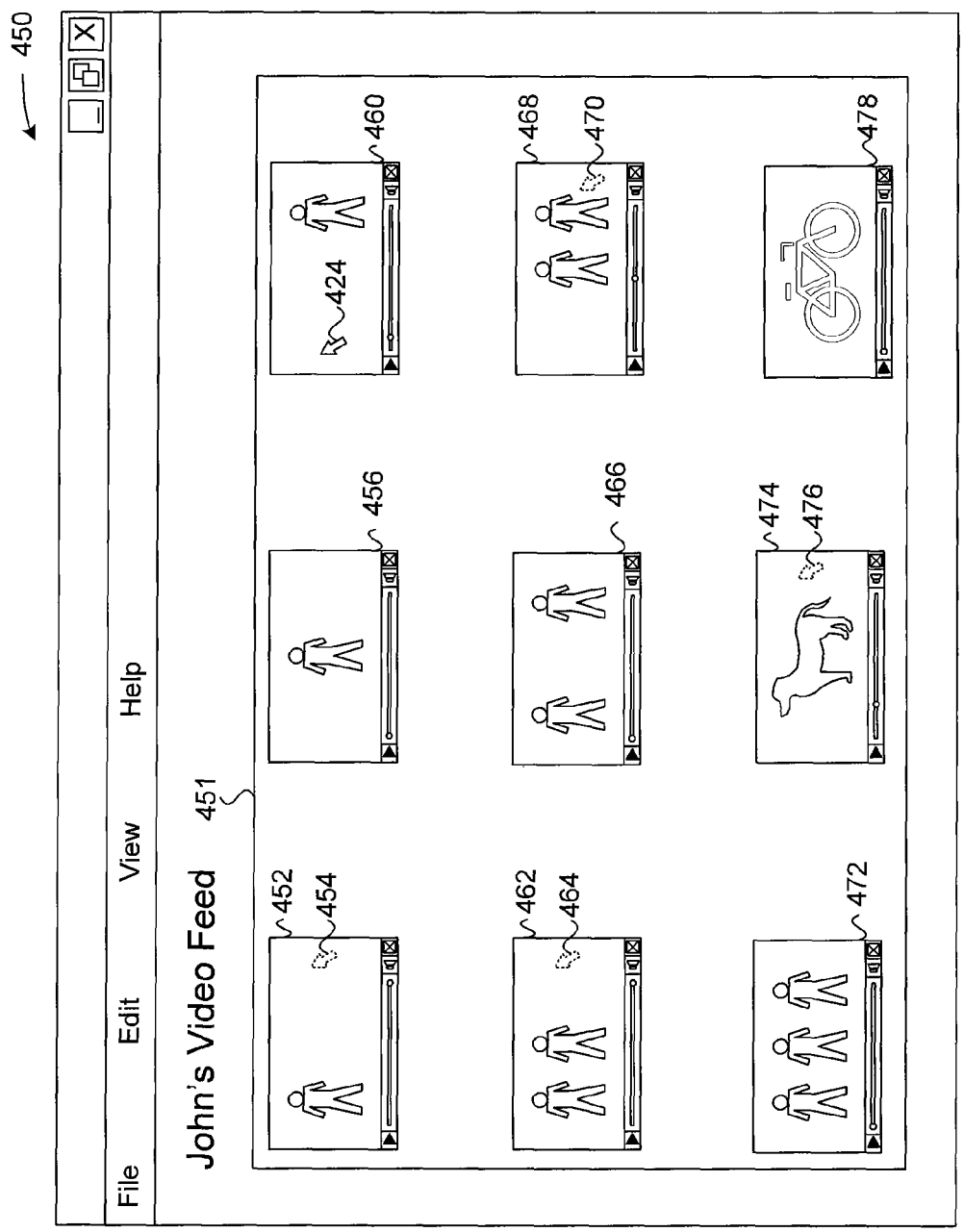
FIG. 4B is a screenshot of a software application that includes a viewport, according to one embodiment of the invention.

FIG. 4B is a screenshot of a software application that includes a viewport, according to one embodiment of the invention. As shown, viewport may be displayed in a software application window 450 that includes a video feed window 451, an active cursor 424, and previous cursors 454, 464, 470, 476. The video feed window 451 includes media players 452, 462, 468, 474, and images 456, 460, 466, 472, 478. In one embodiment, the software application window 450 is associated with a stand-alone software application, other than a web browser, installed on a computing device.

Similar to the browser application 400 shown in FIG. 4A, the images 456, 460, 466, 472, 478 are indistinguishable from the media players 452, 462, 468, 474 to a user of the software application. More specifically, the user of the software application perceives and interprets the images 456, 460, 466, 472 478 as actual media players loaded into the software application. As described herein, a mouse-enter event has not yet occurred for each of the images 456, 466, 472, 478 and, thus, these images remain displayed within the video feed window 451. By contrast, a mouse-enter event has occurred for the images that were previously located in the position of each of the media players 452, 462, 468 and 474.

Again, the previous cursors 454, 464, 470, 476 represent the location of the mouse cursor at previous moments in time. As depicted by the previous cursors 454, 464, 470, 476, each of the corresponding media players 452, 462, 468, 474, respectively, has been "moused-over" by the cursor. As described above in FIG. 3, each image is replaced by a media player when a mouse-enter event is detected over the image. For example, the media player 452 replaced an image (not shown) when the previous cursor entered within the boundaries of the image. Thus, each of the media players 452, 462, 468, 474 were previously represented by images that have been removed subsequent to mouse-enter events. In other embodiments, an event other than a mouse-enter event may trigger an image being replaced by a media player.

Accordingly, in some embodiments, when a user loads a software application that is configured to implement embodiments of the invention, images are loaded for each video to be displayed in the software application. Each image may represent a media player, where the first frame of the video to be played by a particular media player is depicted in the image.

In some embodiments, at least ten images are displayed in the interface within the software application or web browser. In some embodiments, over one-hundred images are displayed in the interface. Using prior art techniques, a separate media player would need to be loaded for each media file to be played by the interface. A typical computer system likely does not have the resources to properly load such a large number of media players at the same time. However, using embodiments of the invention, rather than loading individual media players, images are loaded that represent media players. Loading images instead of media players requires far less computing resources, e.g., memory. Only after an event, such as a mouse-over event, is detected is a particular image replaced with a player. Thus, embodiments of the invention provide for a more reliable and robust technique for playing back media files within a software application, such as a web browser.

Figure 5:
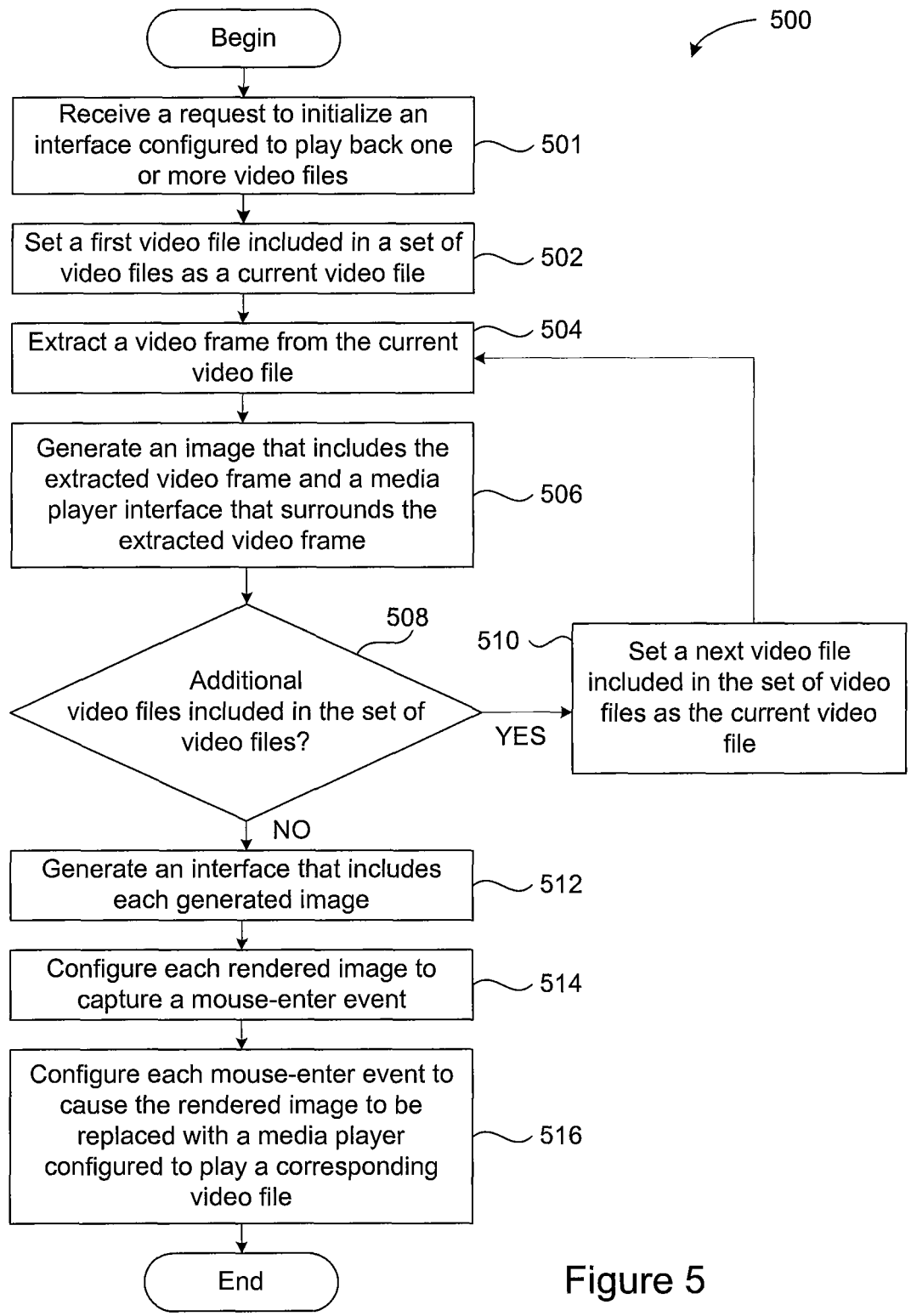
FIG. 5 is flow diagram of method steps for generating an interface that includes images of one or more media players, according to one embodiment of the invention.

FIG. 5 is flow diagram of method steps for generating an interface that includes images of one or more media players, according to one embodiment of the invention. Persons skilled in the art will understand that, even though the method 500 is described in conjunction with the systems of FIGS. 1-4B, any system configured to perform the steps of the method 500 illustrated in FIG. 5, in any order, is within the scope of embodiments of the invention.

As shown, the method 500 begins at step 501, where a software application receives a request to initialize an interface configured to play back one or more video files. Embodiments of the invention are also equally applicable to any type of video file other than video files. In one embodiment, the software application is a web server that generates web page user interfaces for requesting users. A browser application receives the generated web page and displays content of the web page to the user.

At step 502, where a web server application executing on a server computing device sets a first video file included in a plurality of video files as a current video file. In one embodiment, the web server parses each video file in the plurality of video files and references a unique file identifier included in each video file. Each unique file identifier is added to a new row in a memory table. Each row includes two columns, where the first column stores the unique file identifier and the second column stores a Boolean value that represents whether the execution of steps 504-506 has completed for the video file corresponding to the unique file identifier. The current video file is a memory pointer that is updatable to refer to a particular video file. The web server sets the current video file to the video file corresponding to the unique file identifier in the first row of the table.

At step 504, the web server application extracts a video frame from the current video file. In one embodiment, the web server application retrieves the current video file from a database coupled to the server computing device and transfers at least one frame of the current video file into a local memory, such as a random access memory (RAM) included in the server computing device. In other embodiments, the web server application retrieves at least one frame of the current video file from offsite storage using a local area connection or internet connection. Upon retrieval of the at least one frame of the current video file, the web server application parses the video file to extract one video frame. In some embodiments, the web server application is configured to extract the first frame of the video file. However, in other embodiments, the web server application may be configured to extract any frame within the video file—for example, a frame from the middle of the video file, or the final frame of the video file.

At step 506, the web server application generates an image that includes the extracted video frame and a media player interface that surrounds the extracted video frame. The web server application then modifies the generated image to include a rendering of the media player interface. In one embodiment, a playback bar may be added to the image. Optionally, the web server, application may also be configured to render additional elements into the generated image, such as borders and/or shadows. For example, if the web server application is configured to include a 1-pixel black border around the media player interface. In some embodiments, the rendered image can be cached on the web server to decrease latencies that would normally occur by regenerating the rendered image.

At step 508, the web server application determines whether additional video files are included in the plurality of video files to be displayed on the web page. Upon completion of processing each video file at step 506, the Boolean value stored in the row of the unique file identifier corresponding to the current video file is updated from a value of "false" to "true." The web server parses the table to determine whether any rows included in the table have a Boolean value of "false," indicating that at least one video file included in the plurality of video files has not yet been processed by the web server application as described in steps 504 and 506. If, at step 508, the web sever application determines that additional video files are included in the plurality of video files, then the method 500 proceeds to step 510.

At step 510, the web server application sets a next video file included in the plurality of video files as the current video file. In one embodiment, the web server application sets the current video file to the video file that corresponds to the unique file identifier stored in the second row of the table. In some embodiments, the web server application is configured to process each video file in a particular order.

If, at step 508, the web sever application determines that no additional video files are included in the plurality of video files, then the method 500 proceeds to step 512. At step 512, the web server application generates a web page that includes each rendered image. In one embodiment, the web server application generates a hypertext markup language (HTML) page that instructs a browser that reads the HTML page to position the rendered images in a grid. The HTML page includes code that causes the browser to render hyperlinks to additional videos, such as related and/or promoted videos. In other embodiments, the web server application generates the web page using any known coding techniques including, but not limited to, JavaScript by Sun Microsystems, Hypertext Preprocessor (PHP) and/or Active Server Pages (ASP.net) by Microsoft.

At step 514, the web server configures each rendered image to detect a mouse-enter event. In web development, event handlers are used to execute a segment of code upon the occurrence of the associated event. Such segments of code are often referred to as "subroutines." For example, code included in the web page can configure the browser to execute a first subroutine when a particular button is left-clicked by a mouse. The web page can further configure the browser to execute a second subroutine when the mouse is positioned within the boundaries of a particular webpage element, referred to herein as a "mouse-enter" event. In one embodiment, the web application configures the web page to include a mouse-enter event handler linked to each rendered image. Each mouse-enter event handler specifies a particular subroutine that is to be executed when the mouse enters the boundary of the corresponding rendered image.

At step 516, the web server configures each mouse-enter event to cause the rendered image to be replaced with a media player configured to play the corresponding video file. The mouse-enter events that are linked to each rendered image, as described above in step 514, are configured to cause a particular subroutine to be executed. The subroutine, when executed by the browser, directs a request to the web server application to deliver the appropriate video file to the browser. Upon receipt of the video file, the appropriate rendered image is removed from the page and replaced by a media player configured to play the corresponding video file. Additional details of this process are described below in FIG. 5.

In sum, embodiments of the invention provide techniques for receiving a request to generate an interface configured to play back one or more media files. For each of the one or more media files, an image is generated that represents a frame included in the media file. Each image can be replaced with a media player configured to play back the corresponding media file after an event is detected for that particular media player.

Advantageously, embodiments of the invention provide the ability to include multiple media players within a user interface without exhausting resources of a system. Each media player is loaded only when a user selects an image that is rendered to depict a media player, thereby saving memory of the system without degrading the overall user experience.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method, comprising:
receiving a request to generate an interface within a web browser application, wherein the interface has one or more sections in which a video file is to be played back;
generating the interface within the web browser application;
for a first video file, generating an image that includes a non-functional user interface of a media player superimposed on a frame of the first video file, the non-functional user interface including non-functional playback, volume, and video resolution controls, the image including a first portion representing a video control interface associated with the media player configured to play the first video file and a second portion representing the frame of the first video file;
causing the image to be displayed within a first section of the interface;
detecting a predetermined event at a time no media players are loaded into computer memory; and
in response to detecting the predetermined event, loading the media player for the first time into computer memory, increasing the transparency of the image as the media player is loaded, and removing the image from the first section after the media player is loaded.

2. The method of claim 1, wherein the second portion resides within a video playback area of the video control interface.

3. The method of claim 1, wherein the event comprises a mouse cursor crossing a boundary associated with the image displayed within the interface.

4. The method of claim 1, wherein the event comprises at least one finger of a user interacting with the image displayed within the interface.

5. The method of claim 1, wherein the event comprises a keyboard keystroke.

6. The method of claim 1, wherein at least ten images are displayed within the interface, and further comprising the step of
loading the media player into the first section to replace the image only after an event is detected that is associated with the image.

7. A computer-readable storage medium storing instructions that, when executed by a processor, cause the processor to display an image in an interface, by performing the steps of:
receiving a request to generate an interface within a web browser application, wherein the interface has one or more sections in which a video files is to be played back;
generating the interface within the web browser application;
for a first video file, generating an image that includes a non-functional user interface of a media player superimposed on a frame of the first video file, the non-functional user interface including non-functional playback, volume, and video resolution controls, the image including a first portion representing a video control interface associated with the media player configured to play the first video file and a second portion representing the frame of the first video file;
causing the image to be displayed within a first section of the interface;
detecting a predetermined event at a time no media players are loaded into computer memory; and
in response to detecting the predetermined event, loading the media player for the first time into computer memory, increasing the transparency of the image as the media player is loaded, and removing the image from the first section after the media player is loaded.

8. The computer-readable storage medium of claim 7, wherein the second portion resides within a video playback area of the video control interface.

9. The computer-readable storage medium of claim 7, wherein the event comprises a mouse cursor crossing a boundary associated with the image displayed within the interface.

10. The computer-readable storage medium of claim 7, wherein the event comprises at least one finger of a user interacting with the image displayed within the interface.

11. The computer-readable storage medium of claim 7, wherein the event comprises a keyboard keystroke.

12. The computer-readable storage medium of claim 7, further comprising instructions that perform the step of:
loading the media player into the first section to replace the image only after an event is detected that is associated with the image.

13. A computing device, comprising:
a processor; and
a memory storing instructions that when executed by the processor cause the processor to:
receive a request to generate an interface within a web browser application, wherein the interface has one or more sections in which a video file is to be played back;
generate the interface within the web browser application;
for a first video file, generate an image that includes a non-functional user interface of a media player superimposed on a frame of the first video file, the non-functional user interface including non-functional playback, volume, and video resolution controls, the image including a first portion representing a video control interface associated with the media player configured to play the first video file and a second portion representing the frame of the first video file;
cause the image to be displayed within a first section of the interface;
detect a predetermined event at a time no media players are loaded into computer memory; and
in response to detecting the predetermined event, the media player for the first time into the memory, increase the transparency of the image as the media player is loaded, and remove the image from the first section after the media player is loaded.

14. The computing device of claim 13, wherein at least ten images are displayed within the interface, and wherein the processor is further configured to load the media player into the first section to replace the image only after an event is detected that is associated with the image.

* * * * *